| (12) | United States Patent | (10) Patent No.: | US 10,865,044 B1 |
|---|---|---|---|
| | Ulmer | (45) Date of Patent: | Dec. 15, 2020 |

(54) DOUBLE PORTABLE DRIVE-OVER HOPPER

(71) Applicant: Sudenga Industries, Inc., George, IA (US)

(72) Inventor: Craig Curtis Ulmer, Larchwood, IA (US)

(73) Assignee: SUDENGA INDUSTRIES, INC., George, IA (US)

( * ) Notice: Subject to any disclaimer, the term of this patent is extended or adjusted under 35 U.S.C. 154(b) by 0 days.

(21) Appl. No.: 16/577,782

(22) Filed: Sep. 20, 2019

Related U.S. Application Data

(63) Continuation of application No. 15/437,070, filed on Feb. 20, 2017, now Pat. No. 10,457,486.

(60) Provisional application No. 62/298,587, filed on Feb. 23, 2016.

(51) Int. Cl.
| B65G 15/00 | (2006.01) |
| B65G 19/12 | (2006.01) |
| B65G 47/20 | (2006.01) |
| B65G 41/00 | (2006.01) |
| B60P 1/43 | (2006.01) |

(52) U.S. Cl.
CPC .............. B65G 15/00 (2013.01); B60P 1/435 (2013.01); B65G 19/12 (2013.01); B65G 41/008 (2013.01); B65G 47/20 (2013.01)

(58) Field of Classification Search
CPC ...... B65G 15/00; B65G 19/12; B65G 41/008; B65G 47/20; B60P 1/435
See application file for complete search history.

(56) References Cited

U.S. PATENT DOCUMENTS

| 3,170,560 | A | * | 2/1965 | Obmascher | B61J 1/10 |
| | | | | | 198/307.1 |
| 5,297,914 | A | * | 3/1994 | Ash | B65G 67/24 |
| | | | | | 180/298 |
| 9,884,731 | B2 | * | 2/2018 | Wilcox | B60P 1/433 |
| D819,920 | S | * | 6/2018 | Friesen | D34/28 |
| D824,131 | S | * | 7/2018 | Friesen | D34/29 |
| 10,183,812 | B2 | * | 1/2019 | Wilcox | B60P 1/433 |
| 10,239,713 | B2 | * | 3/2019 | Elias | B65G 37/005 |
| 10,414,319 | B2 | * | 9/2019 | Friesen | B65G 41/005 |
| 10,457,486 | B1 | * | 10/2019 | Ulmer | B65G 47/20 |

* cited by examiner

*Primary Examiner* — Saul Rodriguez
*Assistant Examiner* — Ashley K Romano
(74) *Attorney, Agent, or Firm* — Mai-Tram D. Lauer; Westman, Champlin & Koehler, P.A.

(57) ABSTRACT

An apparatus includes a first transverse conveyor, first and second pairs of foldable parallel ramps, and first and second foldable longitudinal conveyors. The transverse conveyor moves material in a first direction. The first pair of foldable parallel ramps extend from a first side of the transverse conveyor. The first foldable longitudinal conveyor is positioned between the ramps of the first pair, and is configured to move material toward the transverse conveyor in a second orthogonal direction. The second pair of foldable parallel ramps extend from a second side of the transverse conveyor and are in alignment with the ramps of the first pair. The second foldable longitudinal conveyor is positioned between the ramps of the second pair and is configured to move material in a third direction that is substantially opposite the second direction.

20 Claims, 15 Drawing Sheets

DOUBLE PORTABLE DRIVE-OVER HOPPER

CROSS REFERENCE TO RELATED APPLICATION

This application is a continuation of U.S. patent application Ser. No. 15/437,070, filed Feb. 20, 2017; which claims the benefit of priority from U.S. Provisional Patent Application No. 62/298,587, filed Feb. 23, 2016, entitled "Double Portable Drive-Over Hopper;" these applications are fully incorporated herein by reference.

BACKGROUND

Grain and other agricultural products are typically transported in vehicles known as "belly-dump" or "side-dump" trucks, gravity wagons, or in similarly functioning trailers. Such trucks or trailers open from the bottom or from a side chute and empty their contents using gravity. These trucks or trailers were originally designed to empty their contents into a hopper built in a ground pit. However, it often is not feasible for a pit to be excavated in the ground. An alternative hopper is a drive-over hopper having a low profile and located on a ground surface. In some designs, the drive-over hopper is portable, so that it can be towed to the desired grain transfer site and set up to function as a substitute for a dumping pit.

A portable drive-over hopper is described in U.S. Pat. No. 5,964,566 to Stewart et al., which is assigned to Sudenga Industries, Inc., and which is fully incorporated herein by reference. Fold-down ramps 12 are provided adjacent to center grate 32 to allow a truck or trailer to drive over the grain hopper. (Abstract; FIG. 1). The driver must align the outlet of the truck's hopper with the center grate 32 or side grate 36, so that grain is not spilled outside of the conveyor area. Such precise alignment usually requires time for the driver to stop, get out of the cab, look at the positioning of the truck outlet with respect to the grates, get back in the cab, drive forward or backward as required, and repeat to check alignment.

This process is particularly time consuming where the vehicle is a double belly dump truck or trailer having two material outlets. In that case, the first material outlet must be aligned with the grate to empty material from the truck's first outlet. Then the driver must move the truck to align the second material outlet with the grate to empty material from the truck's second outlet.

Accordingly, an apparatus that allows a driver to empty both material outlets at once and that does not require such precise alignment by the driver would save time and effort in unloading such material containing trucks.

SUMMARY

In one aspect, this disclosure describes an apparatus comprising a first transverse conveyor, first and second pairs of foldable parallel ramps, and first and second foldable longitudinal conveyors. The transverse conveyor is configured to move material in a first direction. The first pair of foldable parallel ramps extend from a first side of the transverse conveyor, the ramps of the first pair being spaced apart for reception of vehicle wheels thereon. The first foldable longitudinal conveyor extends from the first side, is positioned between the ramps of the first pair, and is configured to move material toward the transverse conveyor in a second direction that is substantially orthogonal to the first direction. The second pair of foldable parallel ramps extend from a second side of the transverse conveyor, the ramps of the second pair being in alignment with the ramps of the first pair. The second foldable longitudinal conveyor extends from the second side, is positioned between the ramps of the second pair, and is configured to move material toward the transverse conveyor in a third direction that is substantially opposite the second direction.

In another aspect, the disclosure describes an apparatus comprising a conveyor and a fin. The conveyor is configured to move material in a first direction. The fin has a first position, wherein the fin extends upwardly and outwardly from an upper edge of conveyor.

In yet another aspect, the disclosure describes an apparatus comprising a conveyor and a plate. The conveyor is configured to move material in a first direction and has an inlet. The plate is disposed over the inlet, wherein the plate has a top surface and a bottom surface, wherein the plate has a first position in which at least some material moving in a second direction impinges the bottom surface.

This summary is provided to introduce concepts in simplified form that are further described below in the Detailed Description. This summary is not intended to identify key features or essential features of the disclosed or claimed subject matter and is not intended to describe each disclosed embodiment or every implementation of the disclosed or claimed subject matter. Specifically, features disclosed herein with respect to one embodiment may be equally applicable to another. Further, this summary is not intended to be used as an aid in determining the scope of the claimed subject matter. Many other novel advantages, features, and relationships will become apparent as this description proceeds. The figures and the description that follow more particularly exemplify illustrative embodiments.

BRIEF DESCRIPTION OF THE DRAWINGS

The disclosed subject matter will be further explained with reference to the attached figures, wherein like structure or system elements are referred to by like reference numerals throughout the several views.

While the above-identified figures set forth one or more embodiments of the disclosed subject matter, other embodiments are also contemplated, as noted in the disclosure. In all cases, this disclosure presents the disclosed subject matter by way of representation and not limitation. It should be understood that numerous other modifications and embodiments can be devised by those skilled in the art which fall within the scope of the principles of this disclosure.

The figures may not be drawn to scale. In particular, some features may be enlarged relative to other features for clarity. Moreover, where terms such as above, below, over, under, top, bottom, side, right, left, etc., are used, it is to be understood that they are used only for ease of understanding the description. It is contemplated that structures may be oriented otherwise.

DETAILED DESCRIPTION

This disclosure relates to a portable drive-over grain hopper for use in moving grain and other particulate material. While reference will be made in this description primarily to grain, it is to be understood that the disclosure also applies to seed, fertilizer, rice, beans, and other granular or particulate matter that may be transported in truck or trailer containers. In particular, the disclosure relates to an improved grain hopper that is capable of receiving grain from all outlets of a container truck or trailer simultaneously. This results in easier use for the truck or trailer driver and significant time savings in unloading the truck/trailer.

Figure 1:
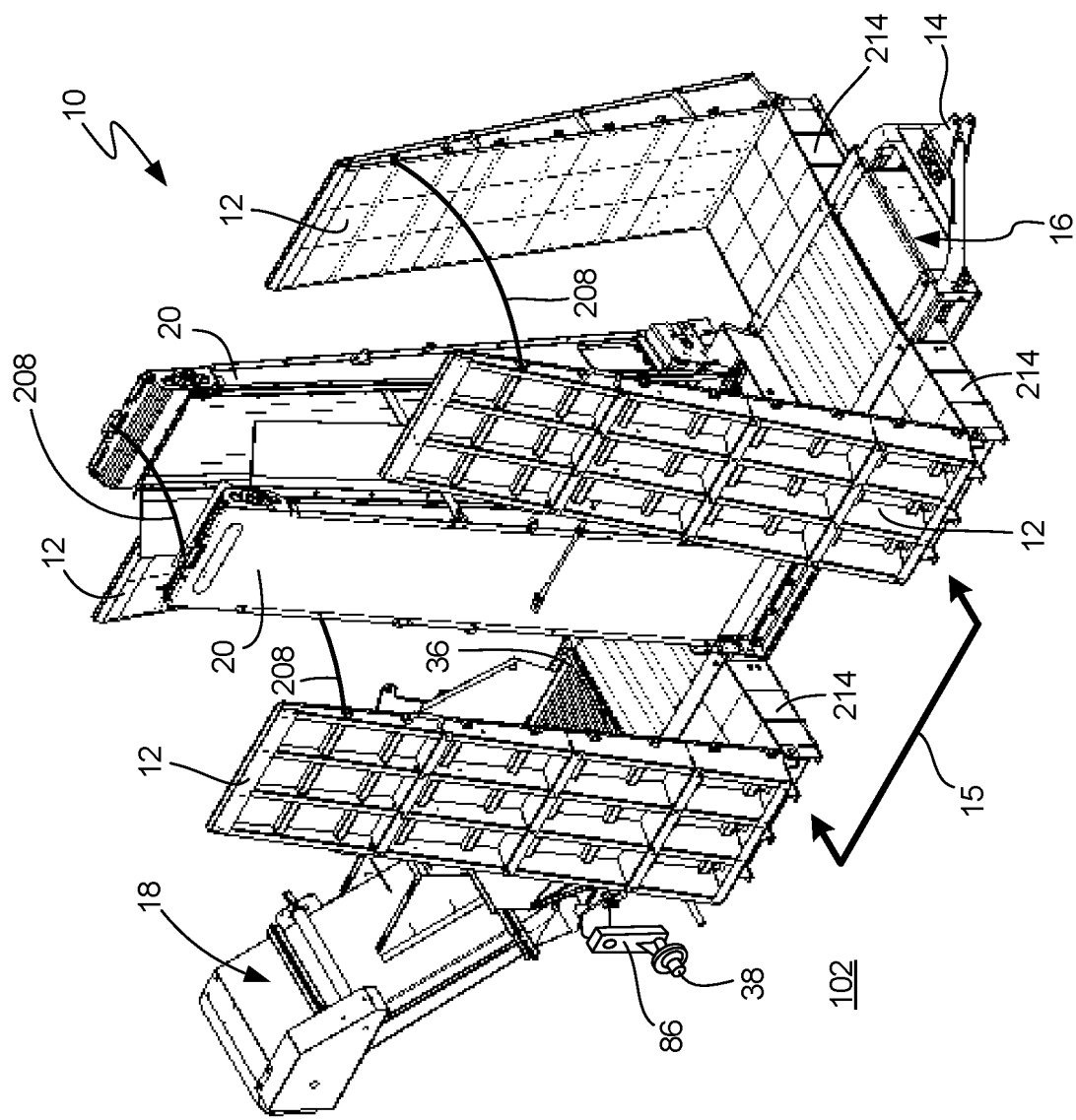
FIG. 1 is a perspective view of an exemplary embodiment of a double portable drive-over hopper of the present disclosure in a folded, transport configuration, with transport wheels not shown.

FIG. 1 is a perspective view of an exemplary embodiment of a double portable drive-over hopper 10 of the present disclosure in a folded, transport configuration. In an exemplary embodiment, major structural components of hopper 10 are constructed from 10-gauge steel, although other materials may also be suitable. The portable drive-over grain hopper 10 includes two pairs of foldable, parallel ramps 12, a removable hitch 14, a transverse conveyor 16, a grain elevator 18, and a pair of foldable, longitudinal conveyors 20. For transport, a pair of wheels 91 (shown in FIGS. 9 and 17) are mounted on hopper 10. For instance, a wheel 91 is mounted on axle 38 (only one axle is shown, but another is provided on the opposite side of hopper 10). Axle 38 is supported on an axle linkage 86 that is movable at least between the positions shown in FIGS. 1 and 2 by actuator 212. In the transport mode shown in FIG. 1, linkage 86 is oriented to place axle 38 in the lowest position with respect to the rest of hopper 10, to engage the wheel 91 with the ground surface 102 and to raise hopper 10 off the road surface for travel clearance. Hopper 10 is attached to a towing vehicle via hitch 14 for transport. Hitch 14 is of a type generally known in the art and is attached (fixedly or removably) to transverse conveyor 16.

Figure 2:
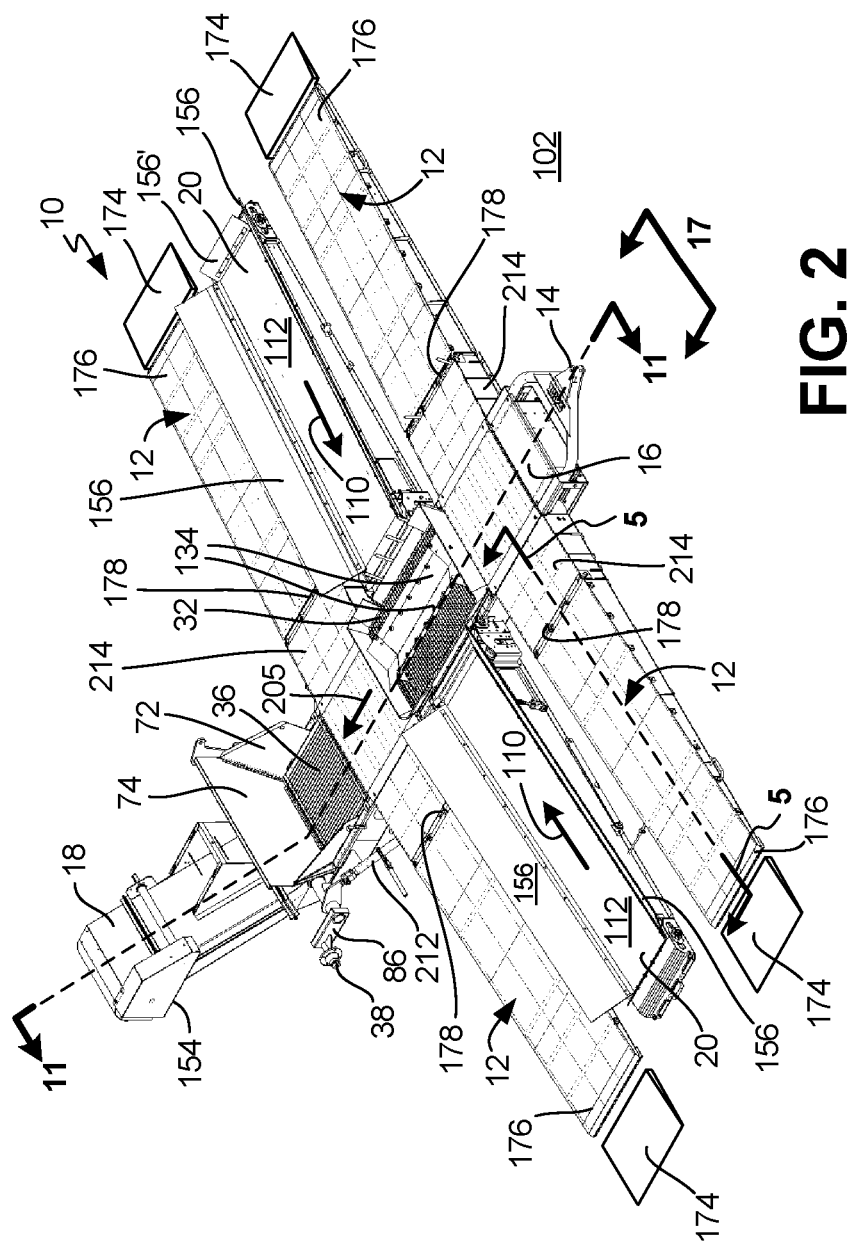
FIG. 2 is a perspective view of the exemplary hopper in an open, grain accepting configuration.
Figure 3:
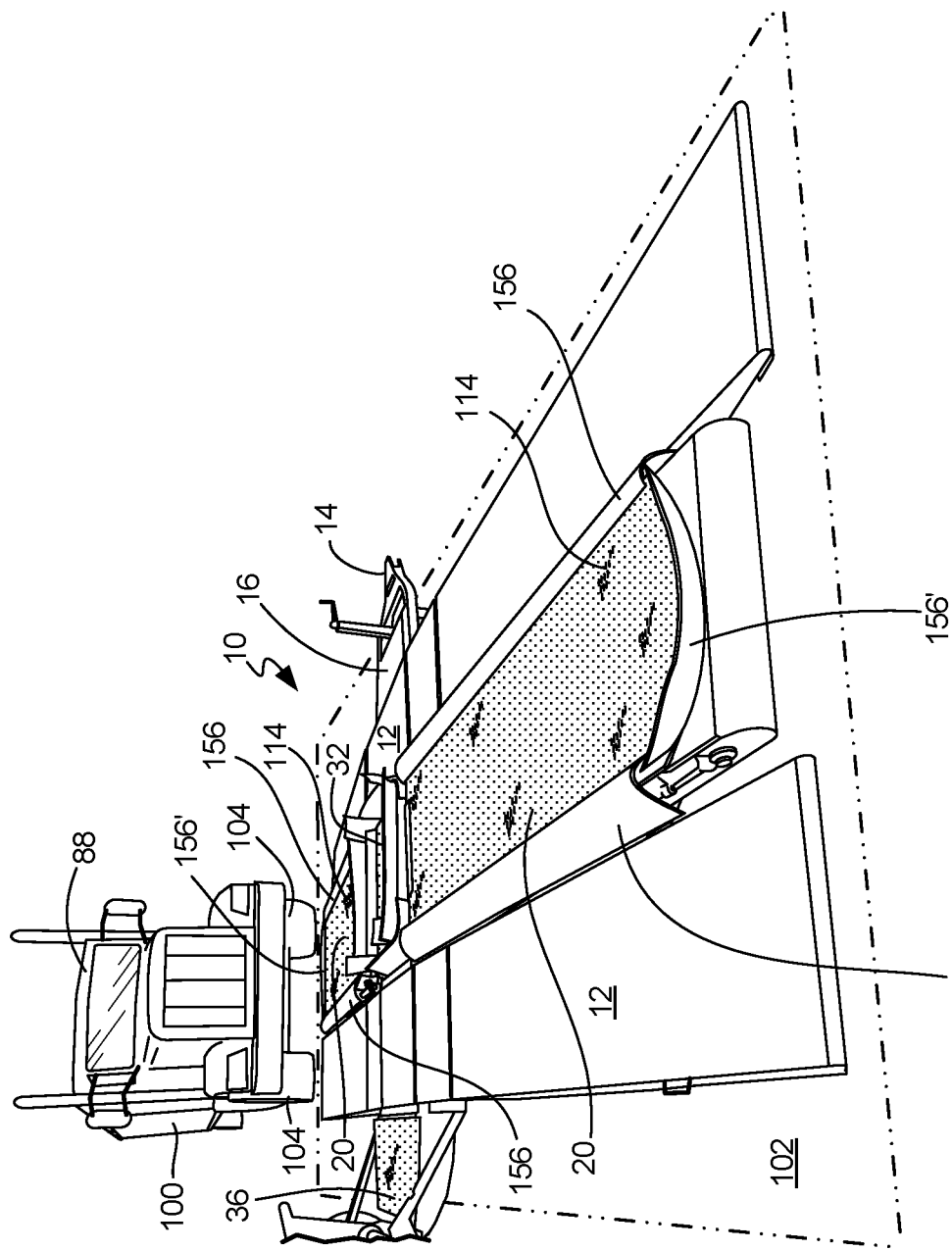
FIG. 3 is a perspective view of a truck positioned to drive on the ramps of the exemplary hopper.
Figure 4:
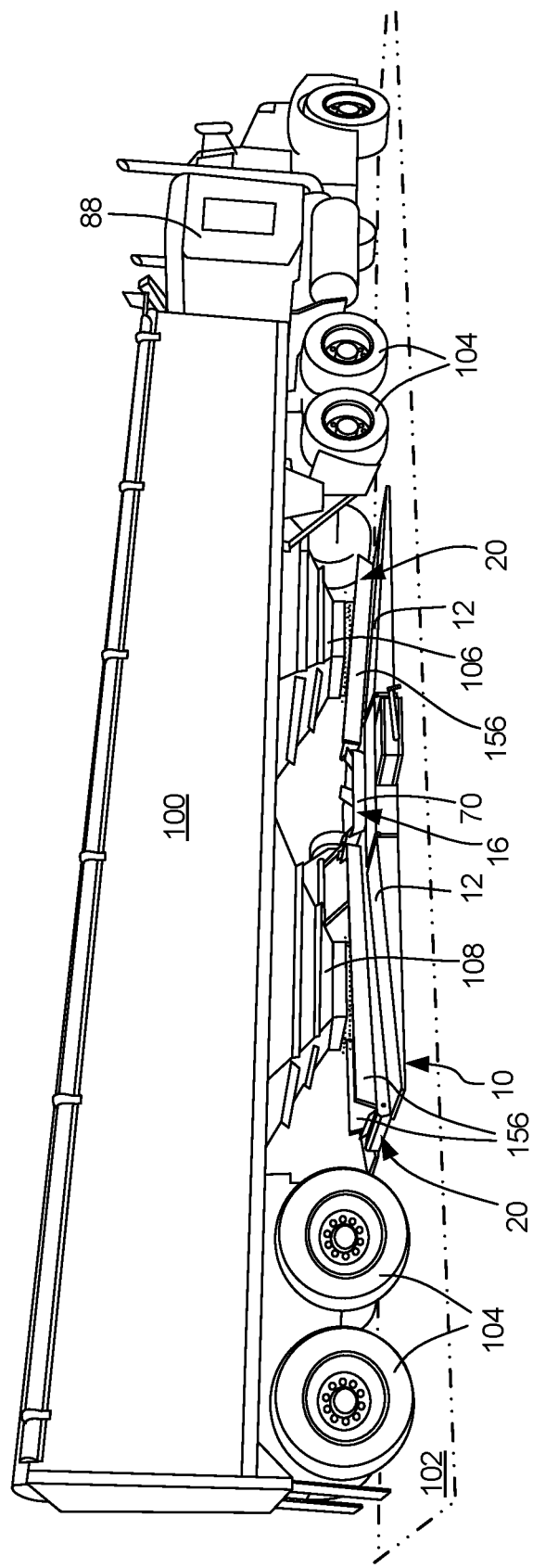
FIG. 4 is a perspective view of a double belly dump trailer of the truck positioned to unload grain onto the exemplary hopper.

FIG. 2 is a perspective view of the exemplary hopper 10 in an open, grain accepting configuration. FIG. 3 is a perspective view of a truck 88 positioned to drive on the ramps 12 of the exemplary hopper 10. FIG. 4 is a perspective view of a double belly dump trailer 100 of the truck 88 positioned to unload grain onto the exemplary hopper 10. After the hopper 10 has been transported to the desired location for truck/trailer unloading, axle linkage 86 is moved, such as by pivoting, to raise the wheel 91 attached to axle 38, thereby lowering hopper 10 onto the ground surface 102.

As shown in FIG. 3, the driver of the belly-dump truck 88 (or associated wagon or trailer 100) whose contents are to be emptied aligns the wheels 104 of truck 88 with ramps 12 before driving the truck onto the unfolded, parallel ramps 12. As shown in FIG. 4, the driver stops the truck 88 when its grain discharge outlets 106, 108 are over longitudinal conveyors 20 and/or center grate 32. Referring to FIG. 2, the user activates motors 162 (shown in FIG. 7B) of the longitudinal conveyors 20 and motor 216 (shown in FIG. 11) of transverse conveyor 16 to move the deposited grain. Each of longitudinal conveyors 20 moves grain in direction 110 toward center grate 32. Grain deposited in center grate 32 of transverse conveyor 16 moves in direction 205 to grain elevator 18 and is thereby raised within grain elevator 18 and deposited therefrom into another receptacle (not shown). Motors 162, 216 may be driven by electric power, hydraulic power, or other sources. In an exemplary embodiment, a suitable motor is a Char-Lynn "H" series motor commercially available from Eaton Hydraulics Group USA of Eden Prairie, Minn.

As shown in FIG. 2, the unfolded, parallel ramps 12 extend laterally from each side of the transverse conveyor 16. The two pairs of foldable ramps 12 are configured such that they are parallel to one another and spaced apart by a distance appropriate to receive and support the wheels 104 of the truck, trailer or wagon that is carrying a load of grain to be dumped. Positioned between each pair of parallel ramps 12 is a longitudinal conveyor 20 connected to transverse conveyor 16 proximate an inlet such as center grate 32. Longitudinal conveyor 20 feeds particulate material to transverse conveyor 16; the conveyors 16, 20 are positioned so that movement direction 205 of transverse conveyor 16 is substantially orthogonal to movement directions 110 of the two longitudinal conveyors 20.

In an exemplary embodiment, each longitudinal conveyor 20 includes conveyor belt 112, which may be covered by an intake grate 114, as shown in FIG. 3. In an exemplary embodiment, intake grate 114 covers substantially an entire upper surface of longitudinal conveyor 20, so that the whole upper surface is configured for receipt of the contents of double hopper trailer 100. Intake grate 114 serves as a filter to prevent large contaminant material from reaching conveyor belt 112. Because grain may be deposited on the entire top surface of each longitudinal conveyor 20 and center grate 32, the driver of truck 88 need not be precise in aligning the outlets 106, 108 of trailer 100 with any particular openings (e.g., longitudinally spaced apart openings) on a top surface of longitudinal conveyors 20; rather, the outlets 106, 108 need only be over any part of grates 114. While intake grates 114 are typically provided on longitudinal conveyor 20 to protect the surface of conveyor belt 112, the intake grates are only shown in FIG. 3. The grain flowing through intake grate 114 is conveyed along the underlying endless conveyor belt 112 toward center grate 32. In an exemplary embodiment, longitudinal conveyor 20 uses a smooth, flat belt made of rubber or other flexible, resilient material. However, other particulate conveying devices are also suitable, including, for example, a chain linkage with paddles, an auger, and other forms of conveyors. Details of suitable conveyor drive mechanisms are disclosed in commonly assigned U.S. Pat. Nos. 8,960,412 and 9,382,075, both of which are hereby incorporated by reference.

Figure 5:
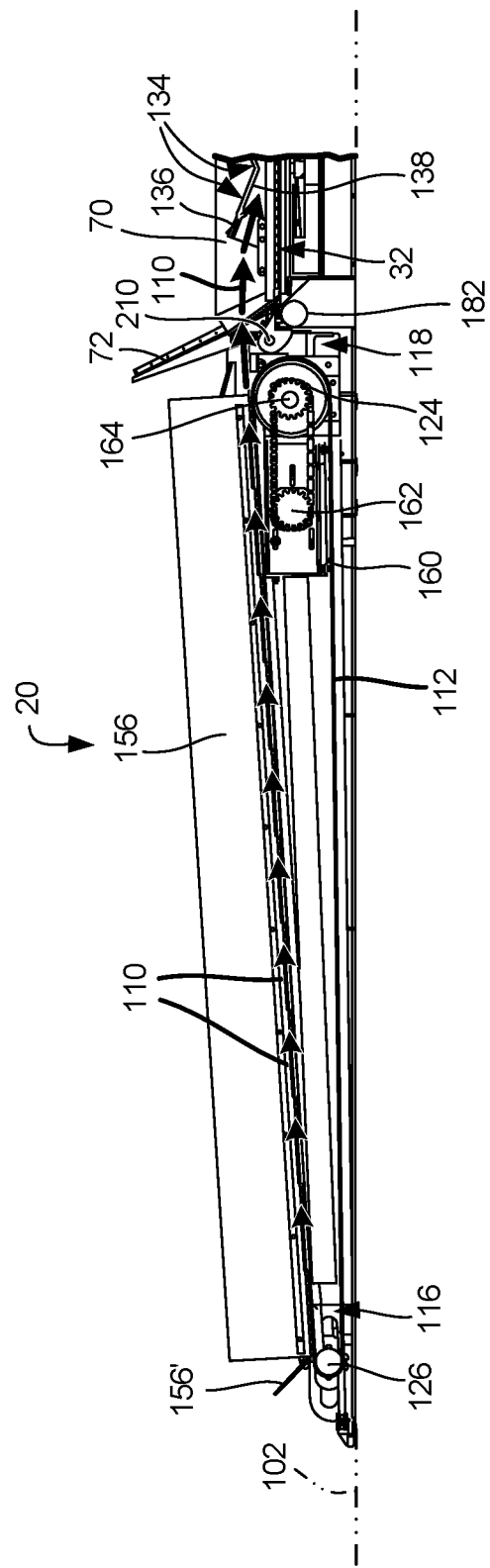
FIG. 5 is a side elevation cross-sectional view of one longitudinal conveyor of the exemplary hopper, taken along line 5-5 of FIG. 2.

FIG. 5 is a side elevation cross-sectional view of one longitudinal conveyor 20 of the exemplary hopper 10, taken along line 5-5 of FIG. 2. In the illustrated embodiment, the profile of longitudinal conveyor 20 is similar to that of ramp 12, in that a distal end 116 (distant from center grate 32) has a very low profile and small height measurement from ground surface 102. The height of longitudinal conveyor 20 increases toward center grate 32, to a maximum height at proximal end 118 of about 10 inches. This low profile allows truck 88 to easily drive on and off ramps 12 and over conveyor 20. Longitudinal grain transfer path in direction 110 extends on an upward inclination from distal end 116 along a top surface of conveyor belt 112 to proximal end 118 near center grate 32. Conveyor belt 12 is configured to form an endless loop that extends over, around and under sprockets 124, 126.

Figure 6:
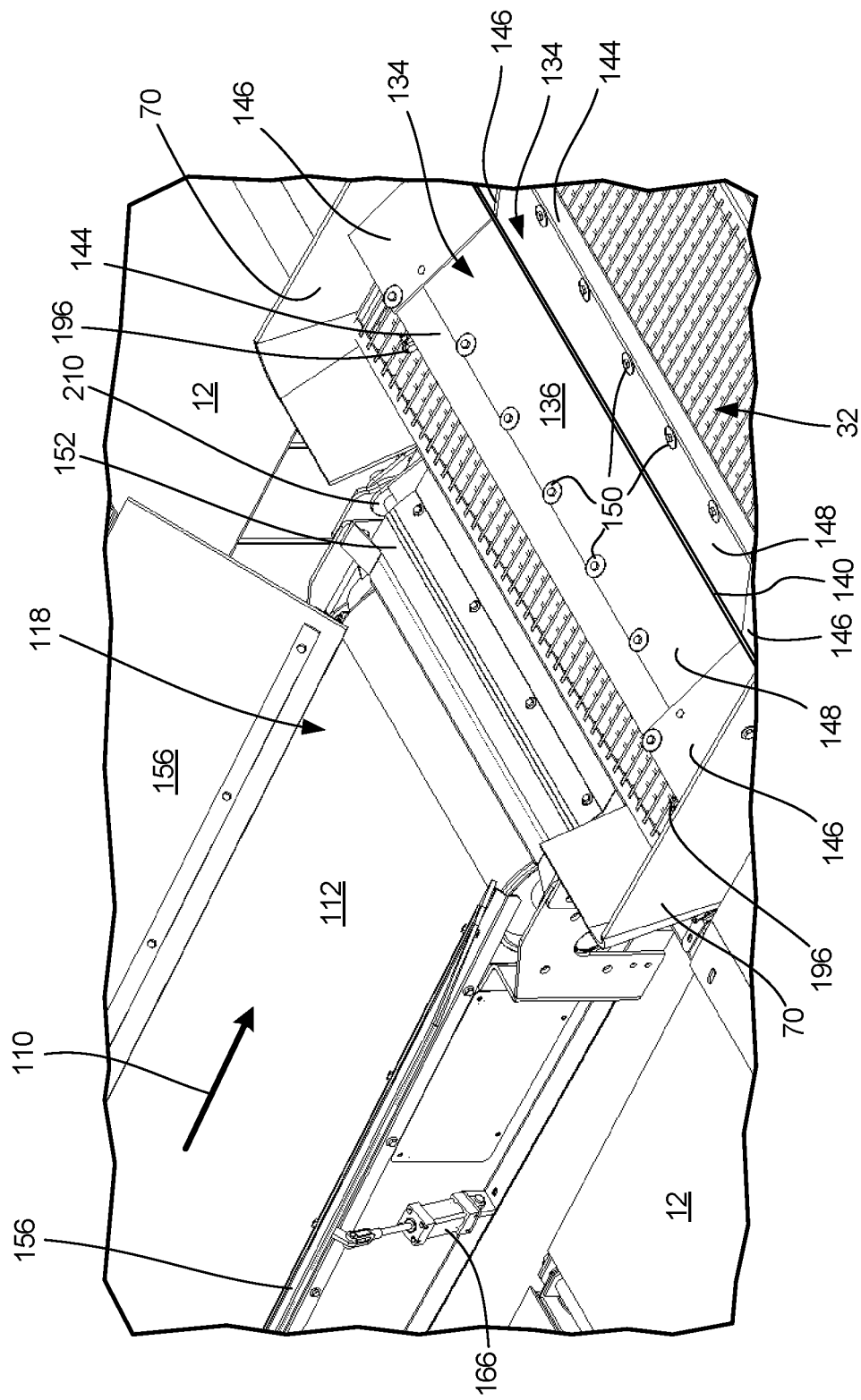
FIG. 6 is a perspective view of an end portion of the longitudinal conveyor and center grate of the exemplary hopper.

Due to the relatively high speed of grain moving in direction 110 on conveyor belt 112, some of the grain may have a tendency to fly over center grate 32, rather than flow downward through center grate 32. Accordingly, in an exemplary embodiment of hopper 10, as shown in FIGS. 5 and 6, two catch plates 134 are provided above center grate 32, each catch plate having a top surface 136 and a bottom surface 138. As shown in FIG. 5, fast-moving particles flowing in direction 110 impinge on bottom surface 138 of catch plate 134 and are deflected thereby, thus changing direction and flowing downward through center grate 32. While an exemplary flow path of particles in direction 110 is illustrated, it is to be understood that some particles will diverge from the illustrated path.

FIG. 6 is a perspective view of a portion of the proximal end 118 of longitudinal conveyor 20 and center grate 32 of the exemplary hopper 10. In an exemplary embodiment, each of two catch plates 134 is positionable to angle downward toward the middle of center grate 32, leaving a gap 140 in the valley therebetween. Thus, any particulates that land on top surface 136 of catch plate 134 can flow downward through gap 140 and downward through center grate 32. In an exemplary embodiment, each catch plate 134 includes a header 144 and two side pieces 146 to which a resilient sheet 148 is attached, such as by fasteners 150. Header 144 and side pieces 146 are made of sheet metal in an exemplary embodiment, and resilient sheet 148 is made from a flexible and durable material such as rubber or polymer. Fasteners 150 may be rivets as shown or other mechanical or chemical fasteners. Thus, in an exemplary embodiment, resilient sheet 148 may deform from the impingement of granular material and possible build-up of granular material, and recover from such deformation without significant permanent damage. Additionally, resilient sheet 148 may be replaced as needed. Moreover, in an exemplary embodiment of hopper 10, threshold 152 is positioned on center grate 32 near the proximal end of conveyor belt 112, to provide a smooth transition between the proximal end of conveyor belt 112 and center grate 32.

Figure 7A:
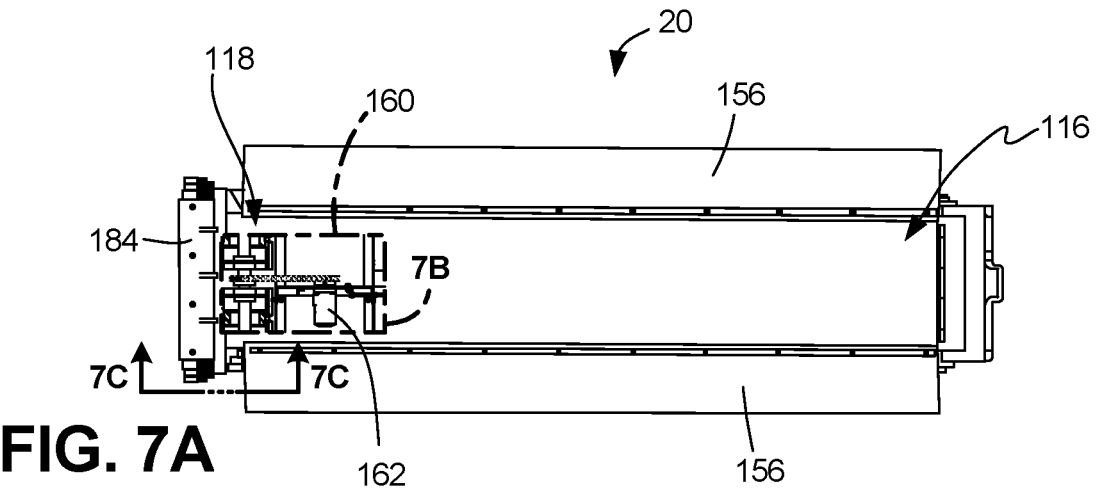
FIG. 7A is a top view of one longitudinal conveyor of the exemplary hopper, with the conveyor belt removed.
Figure 7B:
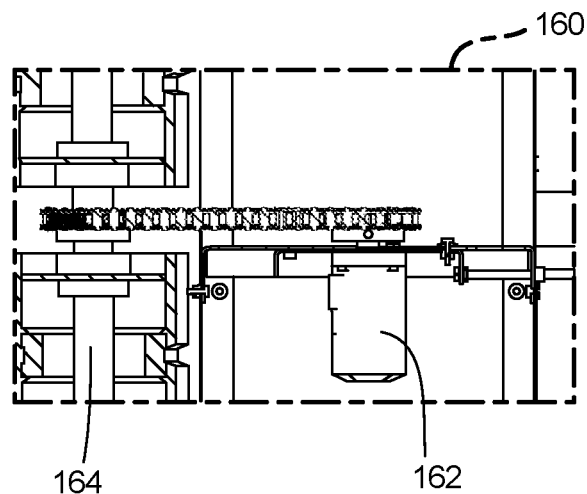
FIG. 7B is an enlarged view of the portion of FIG. 7A designated "7B."
Figure 7C:
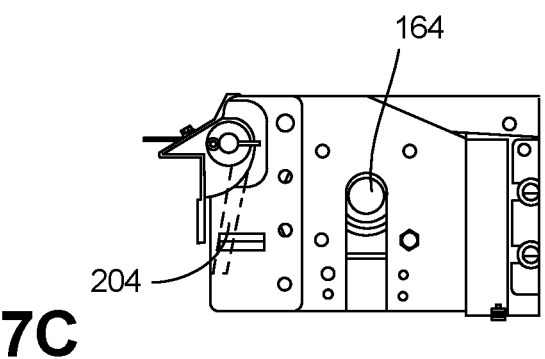
FIG. 7C is an enlarged side elevation view of a portion of FIG. 7A designated as view "7C-7C."
Figure 8A:
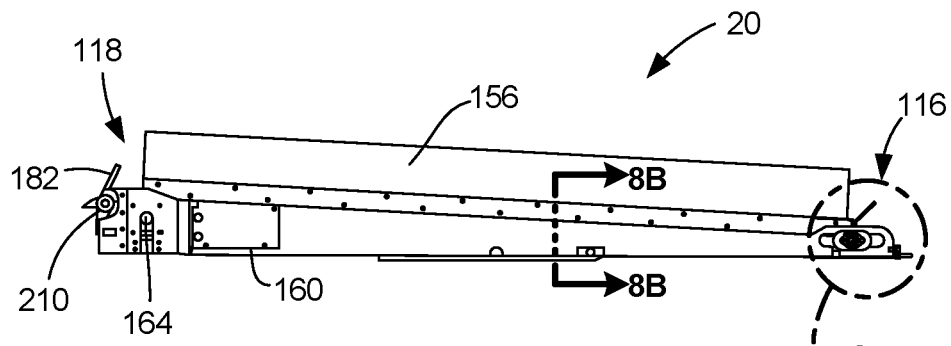
FIG. 8A is a side elevation view of the longitudinal conveyor of FIG. 7A.
Figure 8B:
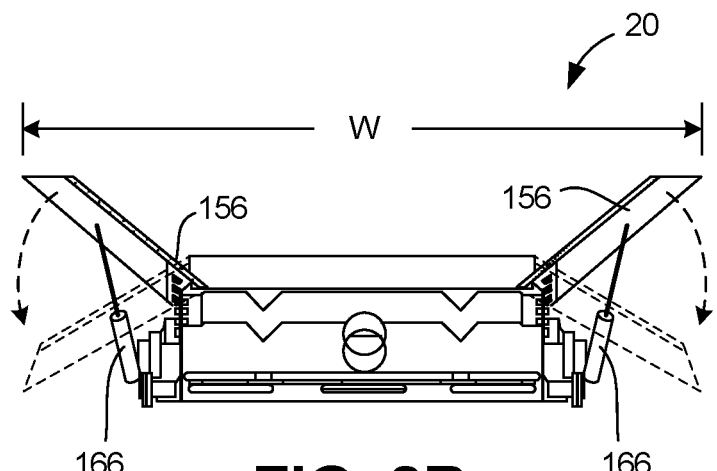
FIG. 8B is a cross-sectional view of the longitudinal conveyor, taken along line 8B-8B of FIG. 8A.
Figure 8C:
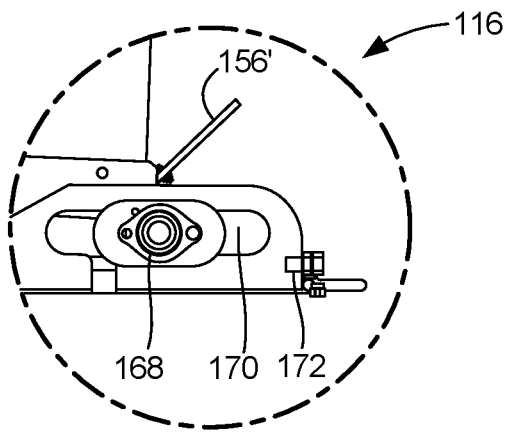
FIG. 8C is an enlarged view of the portion of FIG. 8A designated "8C."

FIG. 7A is a top view of one longitudinal conveyor 20 of the exemplary hopper 10, with conveyor belt 112 removed. FIG. 7B is an enlarged view of the portion of FIG. 7A designated "7B." FIG. 7C is an enlarged side elevation view of a portion of FIG. 7A designated as view "7C-7C." FIG. 8A is a side view of the longitudinal conveyor 20 of FIG. 7A. FIG. 8B is a cross-sectional view of the longitudinal conveyor, taken along line 8B-8B of FIG. 8A. FIG. 8C is an enlarged view of the portion of FIG. 8A designated "8C."

As shown in FIGS. 5, 7A, and 8A, motor box 160 is embedded within the relatively high proximal end 118 of longitudinal conveyor 20. By placing the motor box 160 between the upper and lower belt surfaces of the loop of conveyor belt 112, a low profile of longitudinal conveyor 20 can be maintained. Motor box 160 includes a motor 162, which drivingly engages shaft 164 of sprocket 124. Motor 162 accordingly moves conveyor belt 112 in a continuous loop, so that a top belt surface travels in direction 110 from distal end 116 to a proximal end 118 of longitudinal conveyor 20.

Referring to FIG. 2, longitudinal conveyor 20 includes a hopper skirt including lateral extension fins 156 that may be positioned to extend upwardly outwardly from an upper edge of longitudinal conveyor 20 to funnel deposited material onto conveyor belt 112. In an exemplary embodiment, extension fins 156 include a resilient, flexible material such as rubber or polymer. In the illustrated configuration of hopper 10, longitudinal conveyor 20 has a relatively narrow width. Accordingly, if a driver of truck 88 accidentally drives wheels 104 slightly off ramps 12 and toward a longitudinal conveyor 20, a few inches of clearance on either side of longitudinal conveyor 20 are available to accommodate the mistake, thereby protecting longitudinal conveyor 20 from damage. However, because longitudinal conveyor 20 is relatively narrow, a driver who does not center trailer outlets 106, 108 over longitudinal conveyor 20 may deposit much of the grain on the ground on either side of longitudinal conveyor 20. Thus, lateral extension fins 156 are provided to catch any particulate matter that falls to the sides of longitudinal conveyor 20 and funnel the particulate onto conveyor belt 112. Because lateral extension fins 156 are formed of a resilient, flexible material, even if the wheels 104 of the truck drive over them accidentally, permanent damage may be avoided. Moreover, lateral extension fins 156 are removable for replacement as needed.

As shown in FIGS. 6 and 8B, lateral extension fins 156 may be raised and lowered about hinge joints, such as by the use of cylinders 166. Cylinders 166 may be actuated by hydraulic, pneumatic, and/or other means. In an exemplary method of use, lateral extension fins 156 are in the lowered positions shown in phantom in FIG. 8B (and in FIG. 3) before a truck 88 is driven over longitudinal conveyors 20. In its lowered position, each lateral extension fin 156 extends downwardly and outwardly from an upper edge of longitudinal conveyor 20 and out of the way of structures on the bottom of trailer 100, such as outlets 106, 108, the trailer suspension, and other elements. Accordingly, lateral extension fins 156 are protected from damage by collision with truck and trailer bottom structures.

After the trailer 100 is in position for dumping, as shown in FIG. 4, then cylinders 166 may be actuated to raise lateral extension fins 156 upward to the funneling position shown in FIGS. 2 and 8B. In an exemplary embodiment, longitudinal conveyor 20 has a nominal width of about 21 inches, while a width W as marked in FIG. 8B is about 36 inches (with fins 156 in their upward positions). As shown in FIG. 2, sensor pads 174 may be placed near or on one or more distal ends 176 of ramps 12 to detect the presence of wheels 104. Such detection may be by optical, pressure or other means. A system using hopper 10 and sensor pads 174 may be designed so that the raising and lowering of lateral extension fins 156 is automatic. This may be accomplished by automatic activation of actuators 66 in response to signals from sensor pads 174. For example, when the system is initially set up to receive a load, or when the system is reset to receive the next load, the system can be designed so that a signal that a wheel 104 of truck 88 is on or has rolled past sensor pad 174 controls automatic actuation of cylinders 66 to lower lateral extension fins 156 to the downward position shown in phantom in FIG. 8B and shown in FIG. 3. In the lowered configuration, the lateral extension fins 156 are moved out of the way of additional wheels and truck/trailer bottom structures as the truck/trailer is driven over hopper 10.

Truck 88 and trailer 100 are driven into the unloading position, as shown in FIG. 4. The driver can then get out of the cab of truck 88, and the driver and/or a grain transfer operator can actuate cylinders 166 to raise extension fins 156 to the funnel configuration shown in FIGS. 2 and 4-8B, turn on the conveyor motors 162, 216, and open outlets 106 and 108 initiate the flow of grain. In an exemplary embodiment, the controls can be coordinated so that cylinders 166 automatically raise extension fins 156 when the conveyor motors 162, 216 are turned on. Because the two longitudinal conveyors 20 and center grate 32 present a long, substantially continuous receiving top surface for the particulate material to be unloaded, the driver need not be especially precise about where he or she stops truck 88. As long as front wheels 104 have passed over ramps 12 and outlets 106, 108 are above some portion of longitudinal conveyors 20 and/or center grate 32, the dumped material will be conveyed as desired.

Moreover, because material receiving surfaces of the two longitudinal conveyors 20 and center grate 32 are below both outlets 106, 108, the entire contents of a two-outlet trailer 100 can be emptied in one stop. Thus, it is not necessary to move the trailer after emptying one outlet 106 in order to empty the other outlet 108. Accordingly, significant time savings are realized. When the trailer 100 is empty, the driver/operator will turn off the conveyor motors 162, 216. In an exemplary embodiment, the controls can be coordinated so that cylinders 166 automatically lower extension fins 156 when the conveyor motors 162, 216 are turned off. However, in case the driver is in a hurry to leave, the driver may wish to do so after the trailer 100 is empty, but while there is still particulate matter in hopper 10 to be conveyed by longitudinal conveyors 20 and transverse conveyor 16. If the driver fails to turn off the conveyors or otherwise lower extension fins 156, the disclosed system can be designed so that a signal that a wheel 104 of truck 88 is on or has rolled past sensor pad 174 again controls automatic actuation of cylinders 66 to lower lateral extension fins 156 to the downward position shown in phantom in FIG. 8B and in FIG. 3.

As shown in FIG. 8C, distal end 116 of longitudinal conveyor 20 in an exemplary embodiment includes a conveyor belt tension adjustment assembly including a tensioner 168 that is slidable in, and adjustably secured in, elongated slot 170. Moreover, release 172 allows a user to easily remove the pulley bearing assembly (not shown) in the longitudinal conveyor 20.

Figure 9:
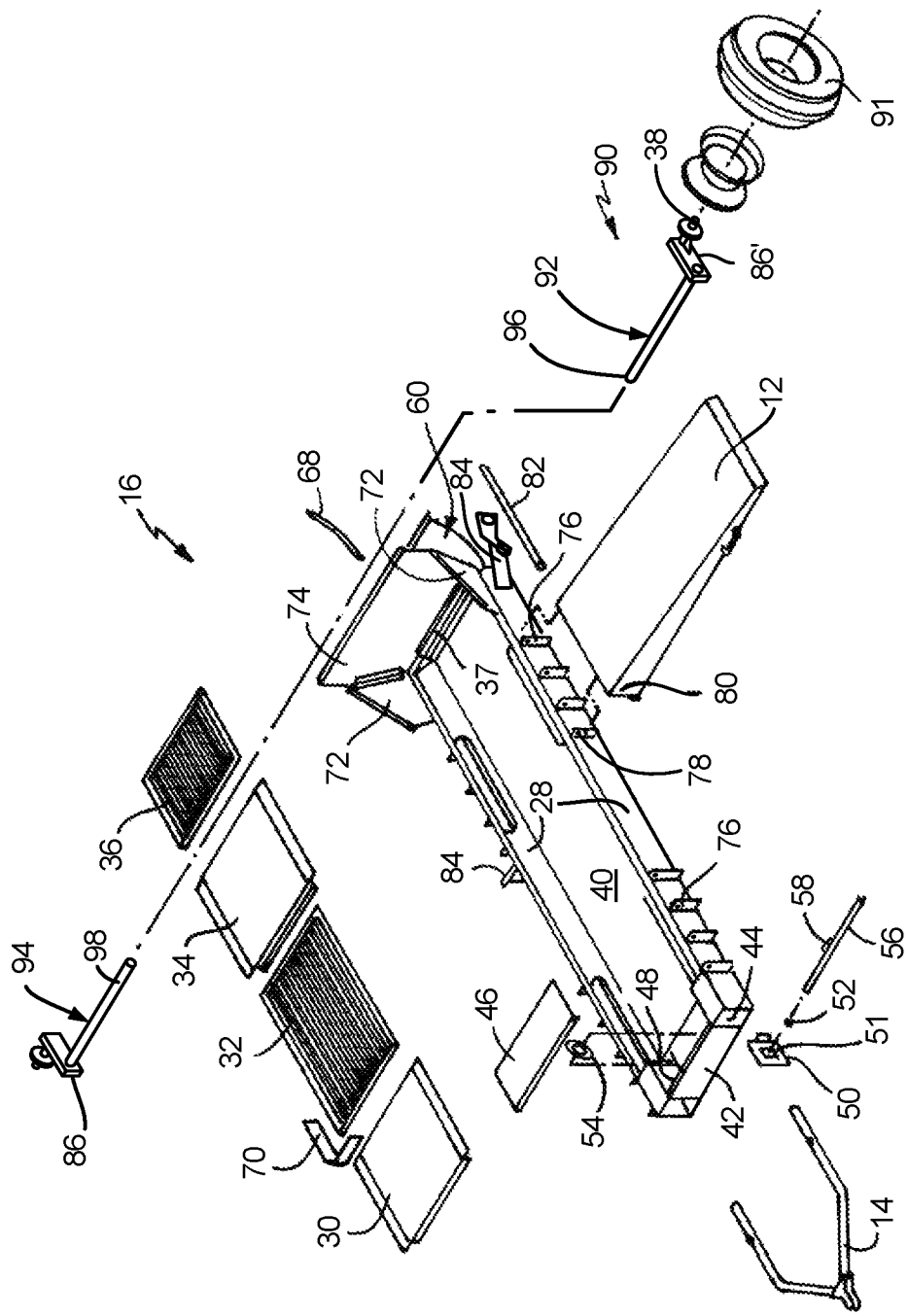
FIG. 9 is an exploded view of components of a transverse conveyor of the exemplary hopper.
Figure 10:
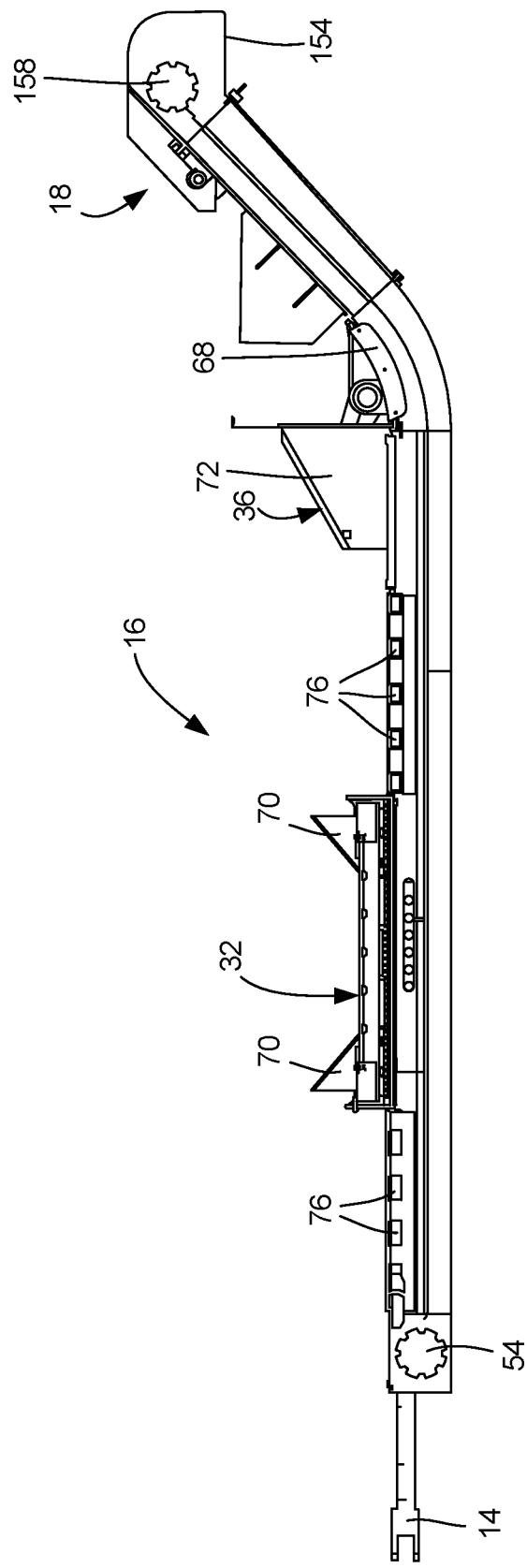
FIG. 10 is a side view of a transverse conveyor and grain elevator assembly of the exemplary hopper.
Figure 11:
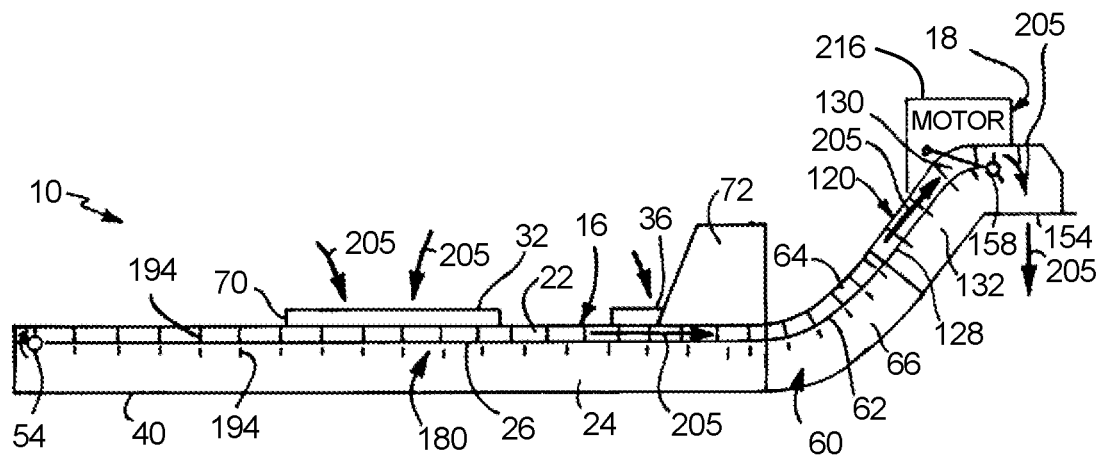
FIG. 11 is a schematic cross-sectional view of the transverse conveyor and grain elevator assembly, taken along line 11-11 of FIG. 2.
Figure 12:
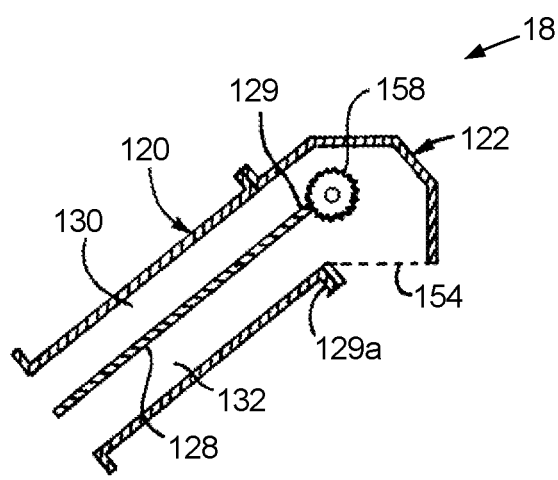
FIG. 12 is an enlarged view of the upper right portion of FIG. 11, showing exemplary grain elevator structure.

As shown in FIG. 2, material emptied onto longitudinal conveyors 20 moves in direction 110 toward center grate 32. From center grate 32, the material is conveyed in direction 205 by transverse conveyor 16 to grain elevator 18. From grain elevator 18, the material is discharged into another receptacle (not shown). FIG. 9 is an exploded view of some components of transverse conveyor 16 of the exemplary hopper 10. FIG. 10 is a side view of an exemplary assembly of transverse conveyor 16 and grain elevator 18. FIG. 11 is a schematic cross-sectional view of the transverse conveyor and grain elevator assembly, taken along line 11-11 of FIG. 2. FIG. 12 is an enlarged view of the upper right portion of FIG. 11, showing an exemplary grain elevator housing structure.

Referring to FIG. 11, one embodiment of transverse conveyor 16 includes an upper hopper chamber 22 and a lower hopper chamber 24 separated by a grain transfer bed 26. As shown in FIGS. 9 and 11, the upper hopper chamber 22 is formed by the grain transfer bed 26, a pair of opposed side panels 28, and a top side, which depending upon the longitudinal position along the transverse conveyor housing, is defined by either a front bridge 30, a center grate 32, a discharge bridge 34, or a side grate 36. The lower hopper chamber 24 is formed by the pair of housing side panels 28, a housing base 40 for its bottom, and as its top, the underside of grain transfer bed 26.

FIG. 9, which is an exploded view of some components of transverse conveyor 16 of the exemplary hopper 10, does not show grain transfer bed 26. Moreover, in some cases, some components are only shown in one side of conveyor 16, though it is to be understood that mirror image components may also be provided on the other side. Some components of the transverse conveyor 16 will now be described in detail substantially from left to right as they are shown in FIG. 9.

An end of transverse conveyor 16 is closed by a front end 42, cap sides 44, and a cap top 46. The cap sides 44 include a slot 48 positioned half-way between the housing base 40 and the cap top 46. The conveyor drive mechanism of the transverse conveyor 16 includes two chain tensioning devices 50 located to the outside of the cap sides 44. In an exemplary embodiment, each chain tensioning device 50 includes a square plate with a central aperture 51 therethrough. A bearing 52 is attached to each chain tensioning device 50 such that an opening of the bearing 52 is in communication with the central aperture 51 of the chain tensioning device 50. A sprocket 54 is supported midway between the cap sides 44 by a shaft 56 having a key 58. The sprocket 54 is mounted by inserting the shaft 56 through the bearing 52 and through the central aperture 51 of the chain tensioning device 50, through the cap side 44, through the sprocket 54, through the other cap side 44, and finally through the bearing 52 and central aperture 51 of the opposite chain tensioning device 50. The sprocket 54 is rotationally secured to the center of the shaft 56 by the key 58 and the relative longitudinal position of the shaft 56 is fixed by securing the chain tensioning devices 50 to the cap sides 44.

The next section of conveyor 16 is between the first pair of foldable, parallel ramps 12 (not shown in FIG. 9), which would be attached to conveyor 16 at ramp connection plates 76. In this section, the top of the upper housing chamber 22 is defined by the front bridge 30. The front bridge 30 spans the width of the transverse conveyor 16, extends between the first pair of foldable, parallel ramps 12 (that would be attached at ramp connection plates 76) and has the same longitudinal extent as the width of those ramps 12. The front bridge 30 is secured to the housing side panels 28 along their upper longitudinal edges and is of sufficient construction to support wheels of the truck 88 and trailer 100 using the double portable drive-over hopper 10.

In the next section, the top of the upper housing chamber 22 includes center grate 32, which serves as a grain inlet opening into the upper housing chamber 22 of the transverse conveyor 16. The center grate 32 has a width equal to that of the housing base 40 and is secured to the housing side panels 28 along their upper longitudinal edges. The center grate 32 extends longitudinally between the first pair of parallel ramps 12 and the second pair of parallel ramps 12. Moreover, the center grate 32 is aligned with both longitudinal conveyors 20 (which would be substantially parallel to the ramps 12). In an exemplary embodiment, center grate 32 includes of a plurality of plates or bars arranged in a parallel or grid configuration. These plates or bars form a filter that prevents large particles or debris that may be present in the trailer's load from entering the upper housing chamber 22.

In the next section, the top of upper housing chamber 22 includes the discharge bridge 34. The discharge bridge 34 spans the width of the transverse conveyor 16, extends between the second pair of foldable, parallel ramps 12 and has a dimension that corresponds to the width of those ramps 12. Like the front bridge 30, the discharge bridge 34 is connected to the housing side panels 28 along their upper longitudinal edges and is of sufficient construction to support wheels of the truck 88 and trailer 100 using the double portable drive-over hopper 10.

In the next section, the top of the upper housing chamber 22 includes side grate 36. The side grate 36 has a width equal to that of the housing base 40 and is secured to the housing side panels 28 along their upper longitudinal edges. The side grate 36 extends longitudinally from the discharge bridge 34 to a far end 37 of upper housing chamber 22. Like the center grate 32, the side grate 36 preferably includes a plurality of parallel or grid-formation plates or bars. These plates or bars form a filter that prevents large particles or debris in the trailer's load from entering the upper housing chamber 22.

The next section of the transverse conveyor 16 consists of an elbow housing 60 that in an exemplary configuration is rectangular in lateral cross-section. As shown in FIG. 11, the elbow housing 60 has an elbow grain transfer bed 62 extending longitudinally therethrough and dividing the elbow 60 into an upper elbow chamber 64 and a lower elbow chamber 66. As such, the upper elbow chamber 66 is in communication with the upper housing chamber 22, and the lower elbow chamber 66 is in communication with the lower housing chamber 24. In the longitudinal direction 205, the elbow 60 curves upwardly, from one end to its other end, for a total curvature of approximately forty-five degrees from the horizontal. In the upper elbow chamber 64, a polymer chain guide 68 (FIGS. 9 and 10) is secured to the center of a top surface of elbow 60 (within the upper elbow chamber 64).

Both the center grate 32 and the side grate 36 have guides for minimizing loss of grain to the outside of the portable drive-over grain hopper 10 during dumping. The center grate 32 has a rubber lip 70 (only partially shown in FIG. 9) that extends upwardly around at least a portion of its periphery.

Figure 17:
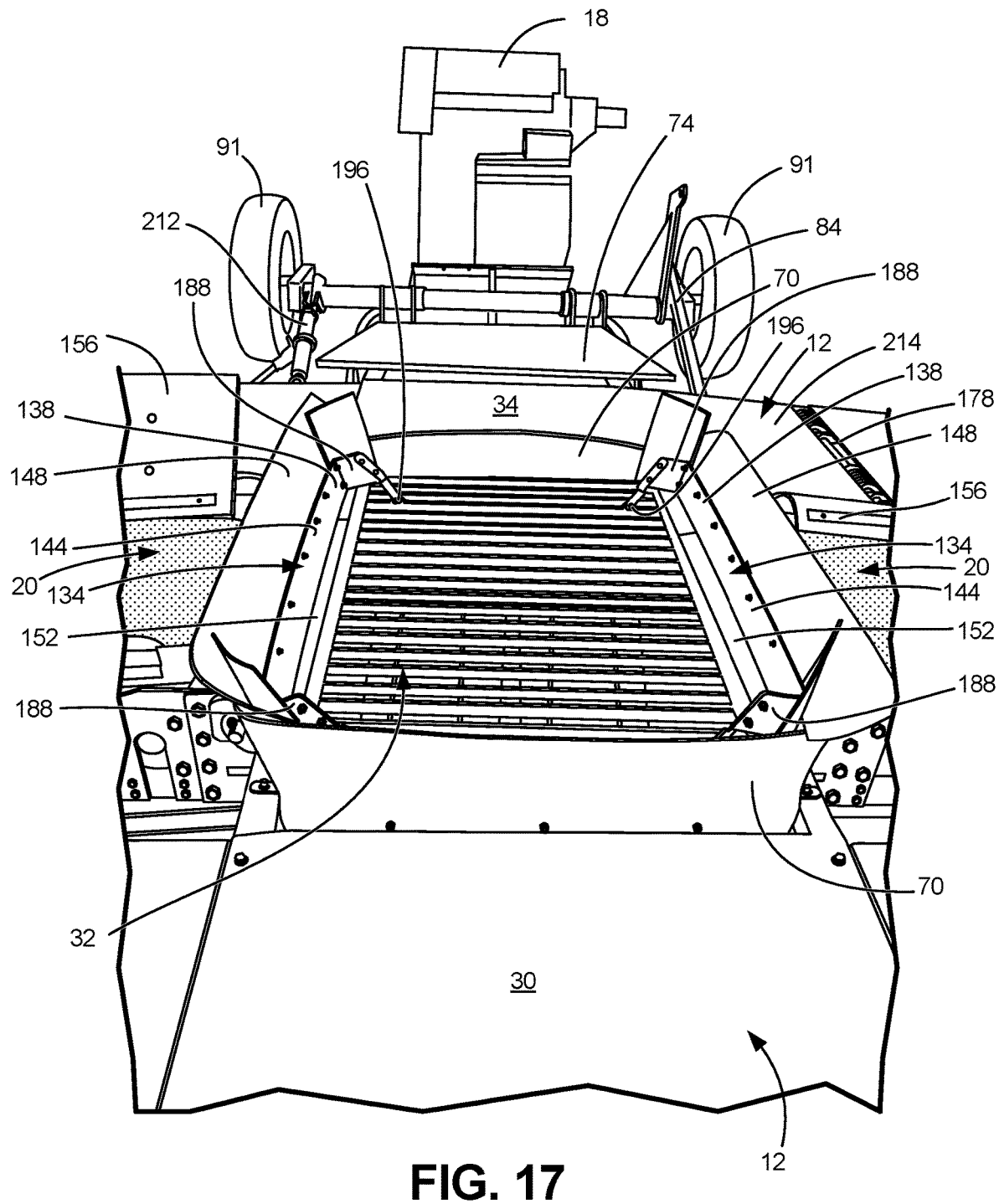
FIG. 17 is a perspective view of the center grate, taken from about vantage point 17 in FIG. 2, with the center grate catch plates opened, and the side grate cover closed, and showing transport wheels.

As shown in FIGS. 6 and 17, in an exemplary embodiment, a lip 70 extends along a side of center grate 32 along ramp 12 and partially around each corner of center grate 32. However, lip 70 does not impede flow of particulate material over threshold 152 between conveyor belt 112 and center grate 32. During operation, the rubber lip 70 can sometimes act as a seal between the center grate 32 and the trailer opening 106, 108 to prevent loss of grain during dumping.

Referring to FIG. 9, side grate 36 is surrounded by a pair of side panels 72 and a closable end panel 74. In an open configuration, end panel 74 extends upwardly and substantially perpendicular to the transverse conveyor 16 above the far end 37 of the upper housing chamber 22. The side panels 72 are attached adjacent upper longitudinal edges to the housing side panels 28 and to the end panel 74; side panels 72 extend upwardly and outwardly with respect to housing side panels 28. During operation, the side panels 72 and the end panel 74 act to funnel grain exiting a side discharge outlet, such as a side chute (not shown) of a grain truck or trailer into the side grate 36. For transport or use only of the center grate 32, the side panels 72 and end panel 74 fold down over the side grate 36 to serve as a cover therefor (as shown in FIG. 17).

FIG. 9 also illustrates how the foldable, parallel ramps 12 are attached to the transverse conveyor 16. At the point of connection, the side panels 28 have a plurality of ramp connection plates 76 extending laterally outward. Each of the ramp connection plates 76 has an aperture 78 at an upper end. Likewise, each of the foldable, parallel ramps 12 has an aperture 80 through an upper end of each vertical side panel thereof. The foldable, parallel ramps 12 are connected to the transverse conveyor 16 by placing the foldable, parallel ramps 12 adjacent to the housing side panels 28 such that the apertures 78 and the openings 80 are in alignment. A ramp rod 82 is then inserted through each of the openings 80 and 78 and secured in position to define a pivot axis for the folding of each ramp. The foldable, parallel ramps 12 are thus secured to the transverse conveyor 16 in a pinned configuration. The ramps 12 are shown in a drive-over position (ready for grain transfer) in FIG. 2 and are shown in a folded, upright position (ready for transport) in FIG. 1.

In FIG. 9, ramps 12 are shown directly connected to housing side panels 28 of conveyor 16. However, FIGS. 1, 2, and 17 show that in an alternative configuration, ramp 12 can be attached alternatively to a housing extension 214. The use of housing extensions 214 allows for relatively long ramps 12 (thereby reducing the incline angle a truck must overcome) while keeping the center of gravity of the folded hopper 10, shown in FIG. 1, relatively low (for stability and easy maneuverability). The housing extensions 214 are sized so that a folded width of hopper 10 remains compact enough for high mobility behind a towing vehicle. Moreover, spring assembly 178 can be used to connect each ramp 12 to its respective housing extension 214. Such a spring assembly 178 can be similar a spring assembly described below for connecting a longitudinal conveyor 20 to transverse conveyor 16.

As shown in FIG. 9, a movable ground transport axle assembly 90 is mountable on the transverse conveyor 16. The axle assembly 90 includes a pair of wheels 91 (only one of which is shown) that are aligned on a common axis. The transverse conveyor 16 has a pair of pivot supports 84 extending laterally from each side thereof for supporting the ground transport axle assembly 90. The axle assembly 90 is formed from two opposed wheel supports 92 and 94. The wheel supports 92 and 94 are mountable on pivot supports 84 and are laterally telescopingly secured together (e.g., bar 96 of support 92 extends into and is secured to tube 98 of support 94).

FIG. 12 is an enlarged view of the upper right portion of FIG. 11, showing an exemplary embodiment of grain elevator 18. Grain elevator 18 includes a lift housing 120 and a discharge housing 122. Lift housing 120 has a grain transfer bed 128 that divides the lift housing 120 into an upper lift chamber 130 and a lower lift chamber 132. The grain transfer bed 128 extends in a plane laterally from one side of the lift housing 120 to the other side and has a longitudinal extension 129 that extends out an upper end 129a of the lift housing 120. The grain transfer bed 128 is configured such that, when the lift housing 120 is connected to the elbow housing 60, the grain transfer bed 128 is aligned with the grain transfer bed 26 and the upper lift chamber 130 is in communication with the upper elbow chamber 64. Adjacent ends of the elbow grain transfer bed 62 and grain transfer bed 128 mate to provide a continuous grain transfer bed that travels over and around chain sprocket 158. In an exemplary embodiment, discharge housing 122 is configured such that when the portable drive-over grain hopper 10 is fully assembled, the plane of the grain discharge opening 154 is generally parallel to the ground 102.

A grain transfer path through transverse conveyor 16 is shown by arrows 205 (FIGS. 2 and 11). The path is primarily defined by the upper chambers formed by the various housing sections, including upper hopper chamber 22, upper elbow chamber 64 and upper lift chamber 130 of the transverse conveyor 16, elbow housing 60 and grain elevator 18, respectively. The grain transfer path within these upper chambers 22, 64 and 130 is itself primarily defined by the grain transfer beds 26, 62 and 128. The grain transfer path, as defined by the beds 26, 62 and 128, has the same lateral width from the point where grain is received thereon (at the grain inlet defined by center grate 32, or at the side grate 36) as when the grain leaves the path adjacent the grain discharge opening 154. This feature allows for rapid and high volume movement of grain through the portable drive-over hopper 10.

Figure 13A:
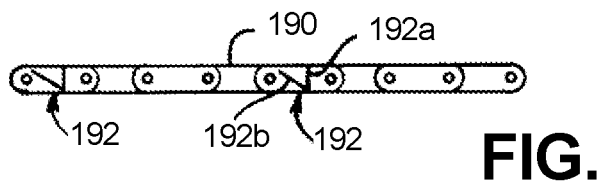
FIG. 13A is a side view of a portion endless conveyer chain for the s verse conveyor.
Figure 13B:
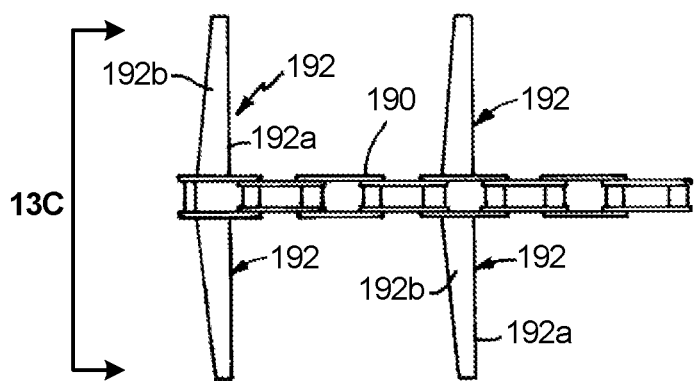
FIG. 13B is a top view of the endless conveyer chain of FIG. 13A.
Figure 13C:
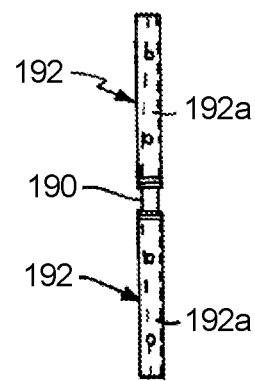
FIG. 13C is a front view of the endless conveyer chain of FIG. 13A, as viewed from vantage point 13C in FIG. 13B.
Figure 14:
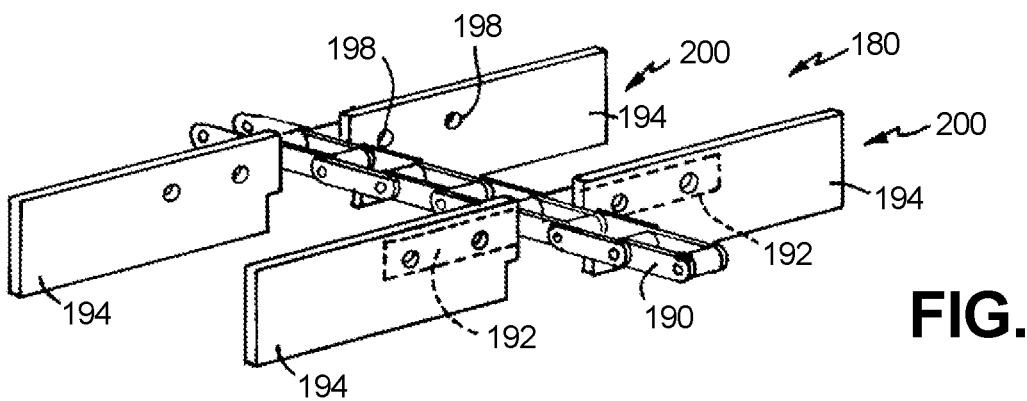
FIG. 14 is a perspective view of a portion of the endless grain conveyor.

FIG. 13A is a side view of a portion of an endless conveyer chain 190 for the transverse conveyor 16. FIG. 13B is a top view of the endless conveyer chain 190 of FIG. 13A. FIG. 13C is a front view of the endless conveyer chain 190 of FIG. 13A. FIG. 14 is a perspective view of a portion of the endless grain conveyer 180. In an exemplary embodiment, the grain is moved over the grain transfer beds 26, 62 and 128 by means of an endless conveyor 180, a portion of which is illustrated in FIG. 14 as a conveyor chain 190 having paddles 194 thereon. However, other particulate conveying devices are also suitable, including, for example, a conveyor belt, an auger, and other forms of conveyors.

The conveyor 180 includes an endless conveyor chain 190, paddle supports 192 and paddles 194. The endless conveyor chain linkage 190 is of a type commonly known in the art, having discrete longitudinal links connected by lateral pivot pins. The endless conveyor chain linkage 190 is configured to form an endless loop that extends from sprocket 54 to sprocket 158, and back underneath the grain transfer beds 26, 62 and 128. (FIG. 11).

As shown in FIGS. 13A-14, paddle supports 192 are spaced longitudinally along the endless conveyor chain 190. At discrete locations, a paddle support 192 extends laterally from the chain 190 on each side thereof. Each paddle support 192 has a paddle support section 192a and a trailing lateral brace section 192b, shown in FIG. 13B. Inner ends of the sections 192a and 192b are welded to one of the links of the chain 190. Paddle 194 is connected to paddle support section 192a by suitable means, such as threaded fasteners 198 inserted through holes in paddle 194 and paddle support section 192a. As seen in FIG. 14, a paddle assembly 200 is defined at spaced locations along the chain 190, with each paddle assembly 200 formed by two co-planar lateral paddles 194, one on each side of the chain 190. The paddles 194 are generally rectangular in shape and are formed in an exemplary embodiment from ultra-high molecular weight recycled plastic material, thereby providing them with the necessary strength, rigidity and wear resistance to offer durability while moving grain at very high speeds through the portable drive-over hopper 10.

As shown in FIG. 11, when motor 216 is activated, chain sprocket 158 begins to turn in a clockwise direction. Thus, through the upper chambers 22, 64 and 130, the grain conveyor 180 and paddle assemblies 200 thereon move to the right in direction 205. When moving through the lower chambers 24, 66, and 132, the grain conveyor 180 and paddle assemblies 200 thereon move to the left.

Each paddle 194 is of a height such that it extends from the grain transfer beds 26, 62 and 128 nearly to the top wall of the respective chamber for each bed. Laterally, each paddle assembly 200 extends essentially entirely across the lateral width of the grain transfer beds 26, 62, 128. The chamber interior clearances and dimensions in the elbow housing 60 are generally the same as in the grain elevator 18 (FIG. 12), relative to the conveyor 180 and its paddle assemblies 200.

In an exemplary method of use, motors 162, 216 for longitudinal conveyors 20 and transverse conveyor 16 can be all operated at the same time, or they can be operated individually. Referring back to FIGS. 2 and 4, when receiving simultaneous loads from two or more trailer outlets, both longitudinal conveyors 20 are operated to move grain in directions 110 to center grate 32, whereby transverse conveyor 16 is operated to move the grain in direction 205 to discharge opening 154. In some cases, the trailer 100 will have only a single outlet that can be positioned over just center grate 32, or over a portion of center grate 32 and a portion of one of the longitudinal conveyors 20. In that case only the motor 216 of the transverse conveyor 16 and a single motor 162 of the corresponding longitudinal conveyor 20 needs to be activated. In yet other cases, the single outlet of the trailer 100 will be centered over the center grate or a side outlet of the truck or trailer will be aligned with side grate 36. In both of these cases, only motor 216 of the transverse conveyor 16 needs to be activated.

Grain from the truck or trailer 100 enters transverse conveyor by passing through the center grate 32 or side grate 36, enters the upper housing chamber 22, and lands upon the grain transfer bed 26. At this point, the grain is contacted by the paddles 194 of the longitudinally spaced paddle assemblies 200 connected to the endless chain 190. The paddles 194 slide longitudinally across the grain transfer bed 26 to push the grain in direction 205. This continues as the paddles 194 travel across the grain transfer bed 26 in the transverse conveyor 16, over the grain transfer bed 62 in the elbow housing 60, and finally over the grain transfer bed 128 in the grain elevator 18. When the conveyor 180 turns the corner at the chain sprocket 158, the grain falls off the free end of the bed extension 129 and exits the portable drive-over hopper 10 through the discharge opening 154. Continued movement of the conveyor 180 causes the paddle assemblies 200 to travel underneath the grain transfer beds 62 and 26 until reaching sprocket 54, where they are positioned for another left-to-right pass along the grain transfer path 205.

Figure 15:
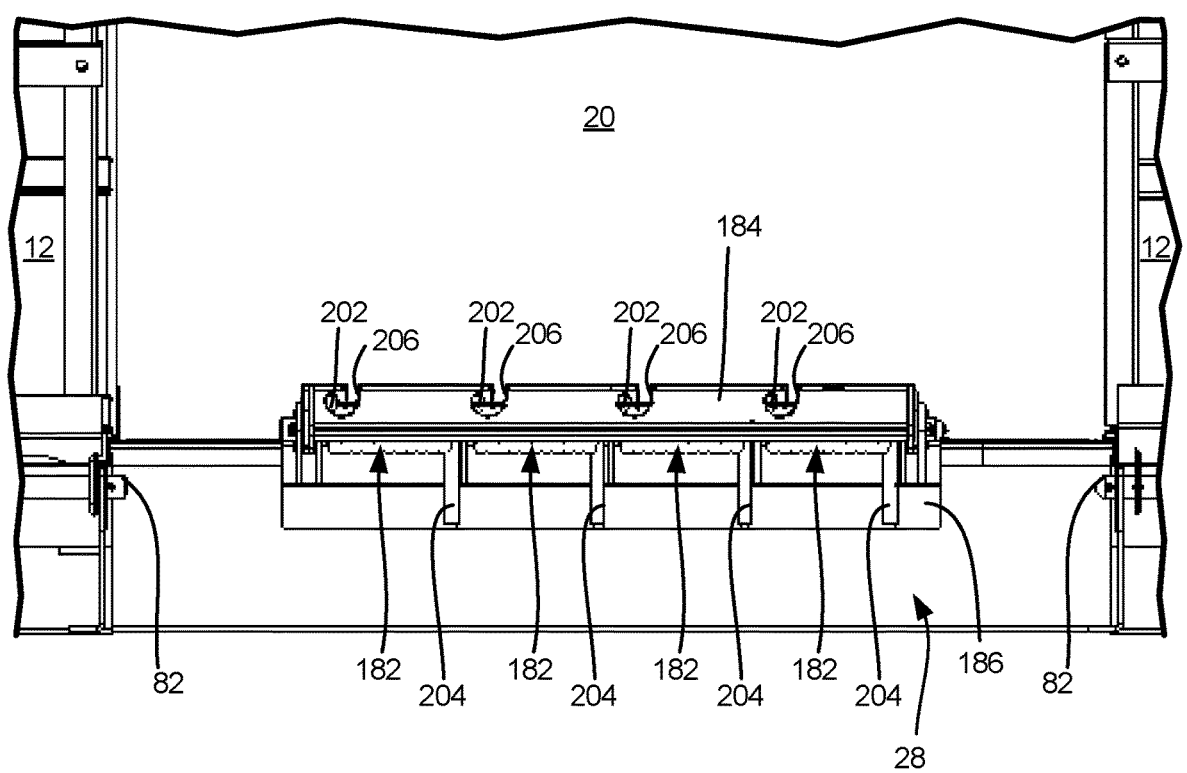
FIG. 15 is a side view of the bottom portion of a raised longitudinal conveyor, as viewed from vantage point 15 in FIG. 1.
Figure 16:
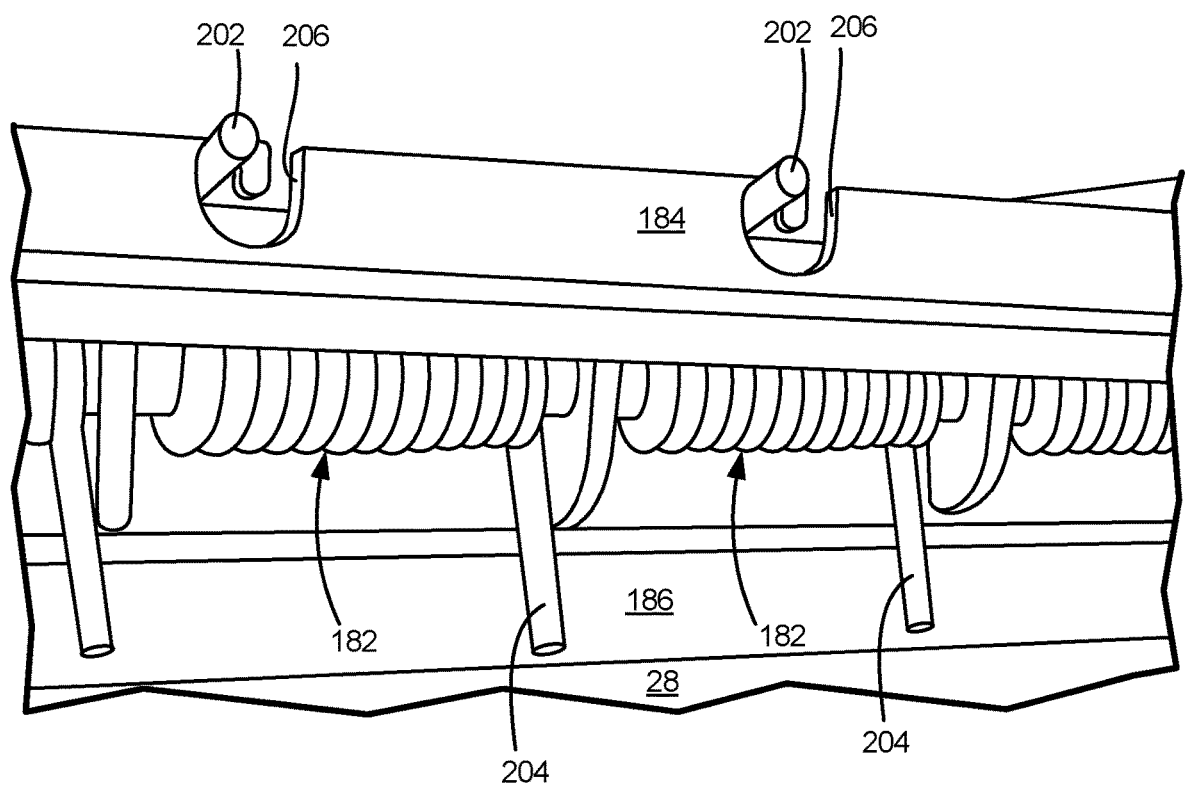
FIG. 16 is a partial perspective view of the weldment and spring assembly of FIG. 15.

After the grain from trailer 100 has been unloaded from the trailer and transferred by hopper 10 to another receptacle (not shown) placed under discharge opening 154, hopper 10 can be folded to the transport configuration shown in FIG. 1. FIGS. 5 and 6 show pivot shaft 210, at which longitudinal conveyor 20 is pivoted upward from the configuration shown in FIG. 2 to the configuration shown in FIG. 1. FIG. 15 is a side view of a bottom portion of a raised longitudinal conveyor 20, as viewed from vantage point 15 in FIG. 1. FIG. 16 is a partial perspective view of the weldment and spring assembly of FIG. 15.

As shown in FIG. 15, longitudinal conveyor 20 is attached to side panel 28 of transverse conveyor 16 in a manner that allows longitudinal conveyor to pivot up from the ground at pivot shaft 210. Torsion springs 182 are positioned between weldment 184 attached to longitudinal conveyor 20 and plate 186 attached to side panel 28. Each torsion spring 182 has a first end 202 and a second end 204. The first end 202 is inserted into a notch 206 in weldment 184, and a second end 204 lies against plate 186. Thus, the force of the spring 182 between the contact points at weldment 184 and plate 186 assists a user in raising longitudinal conveyor 20 from the lowered position shown in FIG. 2 to the raised position shown in FIG. 1. While a particular form of spring-assisted lifting is described herein, it is contemplated that other forms of providing a lifting force can also be used if desired (e.g., hydraulics). Moreover spring assistance or other lifting force assistance can also be provided at the connection between each ramp 12 and transverse conveyor 16 or horizontal extensions 214, such as at spring assemblies 178.

FIG. 17 is a perspective view of the center grate, taken from about vantage point 17 in FIG. 2, with the center grate catch plates 134 opened, the side grate end panel 74 closed, and showing transport wheels 91. In an exemplary embodiment, each catch plate 134 is attached to center grate 32 by an arm 188 pivotally attached to center grate 32 at pivot joint 196. In this configuration, the catch plates 134 have been moved out of the way of a top surface of center grate 32, to allow for more efficient direct deposit of particulate material into center grate 32, such as when a single trailer outlet is positioned directly over center grate 32. Moreover, catch plates 134 in the upward configuration extend at an outward angle relative to center grate 32 to funnel material into center grate 32. In FIG. 17, extension fins 156 of conveyor 20 on the left side of the drawing are shown in a raised position (as in FIGS. 2 and 4-6), while extension fins 156 of conveyor 20 on the right side of the drawing are shown in a lowered position (as in FIG. 3).

To prepare the portable drive-over grain hopper 10 for relocation, the foldable parallel ramps 12 and longitudinal conveyors 20 are lifted until they can be secured in an upward position, such as by cables 208, for example (FIG. 1). Such lifting of the ramps 12 and longitudinal conveyors 20 may be accomplished by hydraulic, manual, or other means. The opposed wheel supports 92 and 94 (shown in FIG. 9) of the movable ground transport axle assembly 90 are assembled, if needed, and aligned on their respective pivot supports 84. Once the wheel supports 92 and 94 are secured together, the portable drive-over grain hopper 10 is then raised off the ground by moving axle linkage 86 from the position shown in FIG. 2 to the position shown in FIG. 1 to engage wheels 91 with the ground. Such movement of axle linkage 86 may be by means of a cable and winch, hydraulic or pneumatic actuators (such as actuator 212 shown in FIG. 2), or other suitable actuator means. Once in this configuration, the portable drive-over grain hopper 10 may be easily moved by connecting the hitch 14 to a towing vehicle.

The portable drive-over hopper 10 provides a fast, convenient, durable and low profile means for unloading belly-dump or side-dump trucks, trailers or wagons. The disclosed hopper 10 is easy to set up for use, and likewise is easy to fold up and prepare for transport. Hopper 10 can be used on any ground surface, without requiring excavation of a pit. Although an exemplary embodiment of hopper 10 has an overall height at its drive-over area (adjacent the ramps 12) of only about 10 inches, grain transfer rates up to about 7,500 bushels per hour are possible. In an exemplary embodiment, a lateral width of each of longitudinal conveyors 20 (without measuring extension fins 156) is about 21 inches, and a lateral width of transverse conveyor 16 is about 24.25 inches. In transverse conveyor 16, the height of the grain discharge outlet 154 from the ground (when in the operating position illustrated in FIG. 2) is approximately 27 inches. However, a greater height of discharge outlet 154 can be achieved by extending a length of grain elevator 18. Center grate 32 has a receiving surface with dimensions of about 36 inches by about 48 inches. Side grate 36 has a receiving surface with dimensions of about 36 inches by about 24 inches. The overall longitudinal length of the portable grain transfer hopper 10 is about 198 inches (without the hitch 14). Each paddle 194 is about three inches high and about ten inches wide. Collectively, the paddle assembly 200 has a lateral width dimension of about 23.5 inches.

Although the subject of this disclosure has been described with reference to several embodiments, workers skilled in the art will recognize that changes may be made in form and detail without departing from the scope of the disclosure. In addition, any feature disclosed with respect to one embodiment may be incorporated in another embodiment, and vice-versa.

What is claimed is:

1. An apparatus comprising:
   a transverse conveyor configured to move material in a first direction;
   a first pair of foldable parallel ramps extending from a first side of the transverse conveyor, the ramps of the first pair being spaced apart for reception of vehicle wheels thereon;
   a first foldable longitudinal conveyor extending from the first side and positioned between the ramps of the first pair and configured to move material toward the transverse conveyor in a second direction that is substantially orthogonal to the first direction;
   a second pair of foldable parallel ramps extending from a second side of the transverse conveyor, the ramps of the second pair being in alignment with the ramps of the first pair;
   a second foldable longitudinal conveyor extending from the second side and positioned between the ramps of the second pair and configured to move material toward the transverse conveyor in a third direction that is substantially opposite the second direction; and
   a sensor configured to detect a presence of at least one of the vehicle wheels.

2. The apparatus of claim 1, further comprising a grain elevator configured to receive material from the transverse conveyor and move the material in an inclined direction to an elevated discharge outlet.

3. The apparatus of claim 1, wherein the sensor is positioned proximate an end of one of the first pair of foldable parallel ramps or one of the second pair of foldable parallel ramps.

4. The apparatus of claim 1, further comprising a fin having a first position, wherein the fin extends upwardly and outwardly from an upper edge of at least one of the first and second longitudinal conveyors.

5. The apparatus of claim 4, wherein the fin is movable to a second position, wherein the fin extends downwardly and outwardly from the upper edge.

6. The apparatus of claim 4, further comprising an actuator configured to move the fin.

7. The apparatus of claim 6, wherein the actuator is configured to be automated in response to a signal from a sensor.

8. The apparatus of claim 1, wherein the transverse conveyor comprises an inlet, and wherein the first conveyor extends from the transverse conveyor proximate the inlet.

9. The apparatus of claim 8, further comprising a plate disposed over the inlet.

10. The apparatus of claim 9, wherein the plate has a top surface and a bottom surface, and wherein the plate has a first position configured so that at least some material moving in the second direction impinges the bottom surface.

11. The apparatus of claim 1, wherein the first foldable longitudinal conveyor comprises:
an endless conveyor belt configured in a loop around first and second sprockets; and
a motor disposed within the loop.

12. An apparatus comprising:
a conveyor:
having a length;
being configured to move material in a first direction along the length; and
having a first width between first and second opposed upper side edges, the first width being perpendicular to the length, and each of the first and second opposed upper side edges being parallel to the length;
a pair of first and second ramps,
each of the first and second ramps being elongated in a direction parallel to the length;
the first ramp configured for positioning proximate and parallel to the first upper side edge;
the second ramp configured for positioning proximate and parallel to the second upper side edge; and
an elongated fin attached to the first upper side edge and configured for positioning proximate and parallel to the first ramp, the fin having a first position, wherein:
the fin extends upwardly and outwardly from the first upper side edge of conveyor; and
a second width from an upper edge of the fin to the second upper side edge of the conveyor is greater than the first width of the conveyor.

13. The apparatus of claim 12, wherein the first and second ramps are configured for reception of vehicle wheels thereon, the apparatus further including a sensor configured to detect a presence of at least one of the vehicle wheels.

14. The apparatus of claim 13, wherein the sensor is positioned proximate an end of one of the first or second ramps.

15. The apparatus of claim 12, further comprising an actuator configured to move the fin, wherein the actuator is configured to be automated in response to a signal from a sensor.

16. An apparatus comprising:
a first conveyor configured to move material in a first direction and having an inlet;
a second conveyor configured to move material in a second direction different from the first direction; and
a plate disposed over the inlet, wherein the plate has a top surface and a bottom surface, wherein:
the plate has a first position configured so that at least some material moving in the second direction impinges the bottom surface; and
the plate has a second position in which the plate extends upwardly and outwardly from the inlet.

17. The apparatus of claim 16, wherein the plate is pivotally connected to the inlet.

18. The apparatus of claim 16, wherein the plate includes a header and a resilient sheet.

19. The apparatus of claim 16, further comprising a grain elevator configured to receive material from the first conveyor and move the material in an inclined direction to an elevated discharge outlet.

20. The apparatus of claim 16, further comprising a fin having a first position, wherein the fin extends upwardly and outwardly from an upper edge of the second conveyor.

\* \* \* \* \*